United States Patent Office 3,398,115
Patented Aug. 20, 1968

3,398,115
POLYOLEFINS STABILIZED WITH MIXTURES COMPRISING AN ORGANIC PHOSPHORUS ACID, PHOSPHITE TRIESTER AND THIODIPROPIONATE
Arthur C. Hecker, Forest Hills, N.Y., and Norman L. Perry, Wayne, N.J., assignors to Argus Chemical Corporation, Brooklyn, N.Y., a corporation of New York
No Drawing. Continuation-in-part of application Ser. No. 161,369, Dec. 22, 1961. This application Aug. 27, 1965, Ser. No. 483,293
13 Claims. (Cl. 260—45.85)

This application is a continuation-in-part of copending application Ser. No. 161,369, filed Dec. 22, 1961, now abandoned.

This invention relates to stabilizers comprising an organic phosphorus acid capable of improving the resistance of propylene polymer and other olefin polymers to thermal cracking when exposed to elevated temperatures and to combinations of stabilizers including organic phosphorus acids capable of improving the resistance of propylene polymers to degradative deterioration in physical properties as a result of exposure to elevated temperatures, to propylene polymer compositions including such stabilizers, and to a process of stabilizing propylene polymers employing such stabilizers.

Polypropylene is a tough, high-melting polymeric material, but in several respects its stability leaves much to be desired. The polymer shows a tendency to decrease rapidly in melt viscosity, and then to become brittle, when kept at elevated temperatures for the time required in milling, calendering, extrusion, injection molding and fiber-forming equipment. This deterioration is particularly serious when the polymer is worked in the molten state in the presence of oxygen, e.g., air. Shaped polymers prepared in such equipment show a tendency to discolor, to become distorted, to crack, and to powder around the edges upon exposure to sunlight and during aging, and especially when heated at moderately elevated temperatures, as in an accelerated aging process, and again, the problem is accentuated in the presence of oxygen. Polypropylene is particularly subject to deterioration in physical properties when exposed to high temperatures, of the order of 150° C. and above. It is now possible, using one or more stabilizers, to obtain a reasonably good stability against deterioration under most processing conditions except high temperatures. Apparently, at such temperatures the polypropylene undergoes thermal cracking, and many of the stabilizers which are effective to improve the stability under other processing conditions have a tendency to worsen the stability of the polypropylene against thermal cracking. Stabilizers which alone increase high temperature resistance tend to become ineffective in the presence of stabilizers added to correct other deteriorative tendencies.

For example, organic triesters of phosphorus acids at temperatures above 150° C. have a tendency to give black spots at high concentrations. Other stabilizers have a tendency to impart a distinct yellowing to the polymer during processing and heat aging at 150° C. and above.

To meet commercial requirements, it is, of course, quite important that the polymer retain its physical properties during all temperature conditions that may be encountered during processing and thereafter. However, the art has experienced great difficulty in achieving the necessary heat stabilization.

Polypropylenes tend to differ in their deteriorative tendencies according to the process by which they are prepared. Apparently, molecular weight and stereo-regularity (tacticity) are factors. This complicates the development of a stabilizer which will make polypropylene sufficiently stable to be utilizable under high-temperature conditions. It would be an additional advantage if such a stabilizer could be incorporated either by the converter or by the manufacturer, without affecting or being itself affected disadvantageously by other stabilizer systems required to counteract other deteriorative effects.

In accordance with the instant invention, a stabilizer is provided comprising an organic phosphorus acid which in combination with other olefin polymer stabilizers or alone improves the resistance and/or resistance to embrittlement of the olefin polymers, such as propylene polymers, against thermal cracking, as evidenced by discoloration and/or by an increase in melt index at elevated temperatures of 150° C. and above for long periods of time.

Purity of propylene polymers, extent of degradation, and resistance to embrittlement at elevated temperatures over long periods of time are characteristics capable of evaluation by observation of the change in melt index of the particular polymer when subjected to specified temperatures for a specified time. There is a direct correlation between the rate of increase in melt index and the rate of deterioration in the above-mentioned physical properties of the polymer. Organic phosphorus acid compounds significantly reduce the rate of increase in melt index at elevated temperatures, and also improve retention of color and other important physical properties of the propylene polymer.

For the purposes of this invention, the retention of physical properties at elevated temperatures is determined by tests carried out at 150° C., but it will be understood that the improvement is obtained at temperatures both above and below this temperature.

The organic phosphorus acids in accordance with the invention can be defined by the following formula:

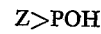

In this formula, Z is an organic radical or radicals attached to the phosphorus through an oxygen or carbon atom. The Z radical can form an heterocyclic ring including the phosphorus atom in the ring, it can be two organic radicals attached to phosphorus through carbon or oxygen, and it can also include an additional OH group.

The organic phosphorus acids are known and well-defined compounds, although their structure is still controversial. Thus, the structure may be written as formallytrivalent phosphorus with an acidic hydroxyl,

or as formally pentavalent phosphorus with a P—H bond,

and the organic phosphorus acids may be thought of as tautomeric mixtures containing both forms in equilibrium. A feature distinguishing the organic phosphorus acids from the tertiary phosphites and analogous trivalent phosphorus compounds such as the fully esterified phosphonites, phosphinites, and tertiary phosphines is the presence of at least one active hydrogen (replaceable by metals such as sodium or the Grignard reagent in a Zerewitinoff determination), as shown in the formula Z>POH. The organic phosphorus acids differ from the organic phosphoric acids by reacting with oxidizing agents under specific conditions, to yield the corresponding phosphoric acid derivatives containing one additional atom of oxygen, as shown by the equation

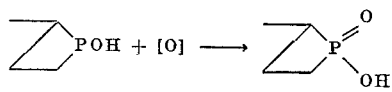

For a more detailed discussion of the structure and reactions of the organic phosphorus acids reference may be made to the book "Organophosphorus Compounds" by G. M. Kosolapoff (John Wiley & Sons, N.Y. 1951), especially p. 144 and pp. 153–195.

Typical organic phosphorus acids which come within this general formula are the following:

I.

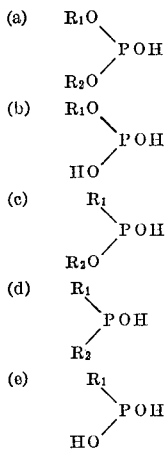

II.

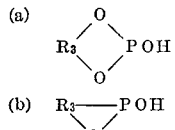

III

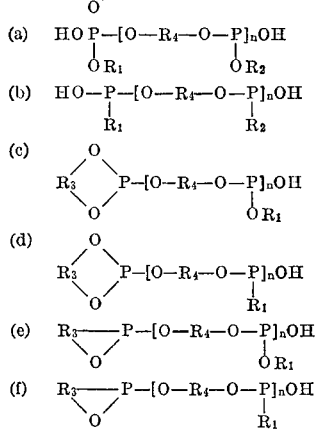

In the above formulae, $R_1$ and $R_2$ represents monovalent organic aliphatic, aromatic and nonaromatic alicyclic hydrocarbon or heterocyclic radicals having from one to about thirty carbon atoms, and $R_3$ and $R_4$ represent bivalent organic aliphatic, aromatic or nonaromatic alicyclic hydrocarbon or heterocyclic radicals having from two to about thirty carbon atoms. $R_1$ and $R_2$ in Groups I and III may be the same or different.

The compounds of III are polymeric, $n$ representing the number of repeating units enclosed by the brackets. $n$ may have a value ranging from one to about thirty.

It will be evident that all of these compounds are organic phosphorus acids containing a trivalent phosphorus in which there is at least one replaceable hydrogen per molecule and preferably one replaceable hydrogen for each phosphorus atom of the organic phosphorus acid containing trivalent phosphorus. Thus, compounds of Groups I and II are preferred for use in the invention.

As exemplary of the compounds coming within Group I, there are suggested the following:

di(phenyl) phosphite,
monophenyl phosphite,
mono-(diphenyl) phosphite,
dicresyl phosphite,
di(o-isooctylphenyl) phosphite,
di(p-ethylhexylphenyl) phosphite,
di(p-t-octylphenyl) phosphite,
di(dimethylphenyl) phosphite,
di-n-butyl phosphite,
di-2-ethylhexyl phosphite,
mono-2-ethyl hexyl phosphite,
diisooctyl phosphite,
monoisooctyl phosphite,
monododecyl phosphite,
2-ethylhexyl phenyl phosphite,
2-ethylhexyl-(n-octylphenyl) phosphite,
monocyclohexyl phosphite,
dicyclohexyl phosphite,
di(2-cyclohexyl phenyl) phosphite,
di-α-naphthyl phosphite,
diphenyl phenyl phosphite,
di(diphenyl) phosphite,
di-(2-phenylethyl) phosphite,
dibenzyl phosphite,
monobenzyl phosphite,
n-butyl cresyl phosphite,
didodecyl phosphite,
ditetrahydrofurfuryl phosphite,
difuryl phosphite,
benzenephosphonous acid,
mono-2-ethylhexyl benzenephosphonite,
monophenyl butanephosphonite,
mono-2-butoxyethyl α-naphthalenephosphonite,
mono-n-octyl cyclohexanephosphonite,
α-toluenephosphonous acid,
diphenyl phosphinous acid,
dibutyl phosphinous acid,
benzyl methyl phosphinous acid.

Exemplary of compounds within Group II are: ethylene phosphite, propane-1,3-cyclic phosphite, 2-methylpropane-1,3-cyclic phosphite, 2,2-dimethylpropane-1,3-cyclic phosphite, 1,3-diphenylpropane-1,3-cyclic phosphite, butane-1,3-cyclic phosphite, 4-methylbutane-1,3-cyclic phosphite, 3-methylbutane-1,3-cyclic phosphite, 4-phenylbutane-1,3-cyclic phosphite, 3-cyclohexylheptane-1,3-cyclic phosphite, 1,3,7-triisopropylheptane-1,3-cyclic phosphite, and cyclohexane-1,3-cyclic phosphite.

Exemplary of organic phosphorus acid containing trivalent phosphorus coming within Groups III(a) and III(b) are the compounds wherein $R_4$ is neopentylene, ethylene, propylene-1,2, propylene-1,3, butylene-1,4, butylene-1,3, pentamethylene, hexamethylene, octamethylene, decamethylene, cyclohexylene, n-butylidene and diphenyl methane. In these compounds, $R_1$ and $R_2$ can be hydrogen, methyl, ethyl, propyl, butyl, isopropyl, isobutyl, isoamyl, phenyl, cyclohexyl and naphthyl.

Exemplary of compounds coming within Group III(b) are the compounds wherein $R_1$ and $R_4$ are any of those given above in connection III(a) and III(b), and $R_3$ is any of the various radicals of the compounds of Group II. Exemplary of Group III(a) are:

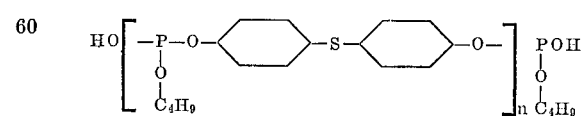

and

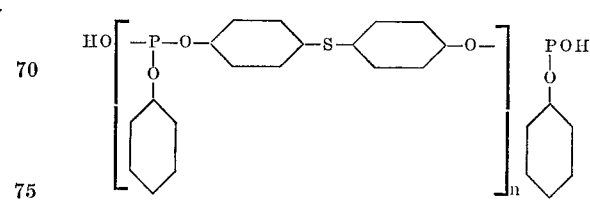

Exemplary of Group III(b) are:

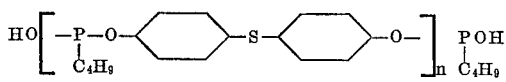

and

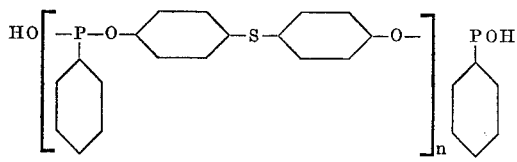

Exemplary of Groups III(c), (d), (e), and (f) are:

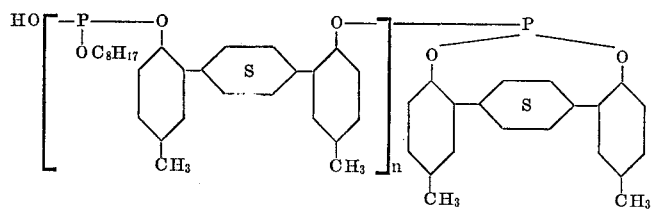

and

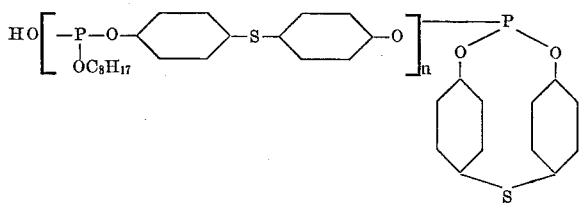

and

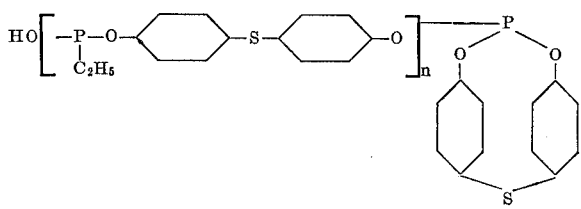

and

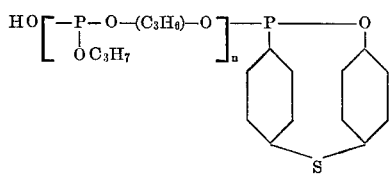

and

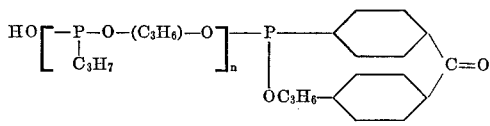

The organic phosphorus acids of the invention are effective stabilizers when used with olefin polymers, and especially propylene polymers, as the sole stabilizer. Their effectiveness is particularly evidenced by an improved resistance to an increase in melt index upon exposure to elevated temperatures. They can also be used in conjunction with other propylene polymer stabilizers, wherein they are effective in overcoming disadvantageous effects contributed by the other stabilizers in the absence of the phosphorus acid. In many cases, an enhanced or synergistic effect is observed. Such additional stabilizers include, for instance, phenols, organic triphosphites, thiodipropionic esters, polyvalent metal salts of organic acids, organic mercaptans, and organic polysulfides.

When the organic phosphorus acid stabilizer is used in conjunction with a phenol the increased stabilizing effect is evidenced by improved resistance to yellowing, and an extended life, in terms of resistance to embrittlement and development of tackiness at elevated temperatures. The phenol stabilizers contain one or more phenolic hydroxyl groups, and can contain one or more phenolic nuclei. In addition, the phenolic nucleus can contain an oxy or thio ether group.

The alkyl-substituted phenols and polynuclear phenols because of their molecular weight have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one, or in the same or different rings, if there are more than one. In the case of bicyclic phenols, the rings can be linked by thio or oxy-ether groups, or by alkylene, alicyclidene or arylidene groups. Such phenols, which are preferred because of their superior stabilizing action, can be defined by the formula:

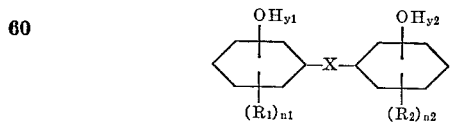

where X is an oxygen or sulfur atom, or an alkylene or alicyclene or arylene or a mixed alkylene-alicyclene or alkylene-arylene or aryl-alkylene group, having a straight or branched chain, whose total number of carbon atoms ranges from one to about eighteen, $y_1$ and $y_2$ are the number of phenolic hydroxyl groups OH, $n_1$ and $n_2$ are the number of R groups, and $R_1$ and $R_2$ are hydrogen or alkyl of one to about eighteen carbon atoms. Preferably, the OH groups are ortho and/or para to X.

The sum of $y$ and $n$ in each ring cannot, of course, exceed five.

Typical X groups are —CH$_2$—, —CH$_2$CH$_2$—,

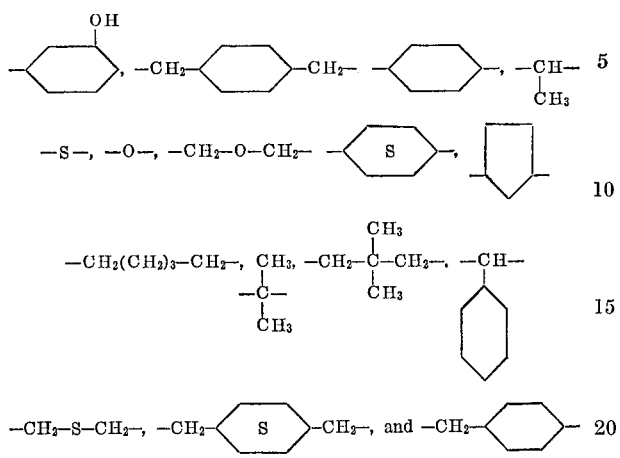

The various X and R groups are exemplified in the following compounds.

Exemplary of satisfactory monohydric phenols are 2,6-di-tertiary-butyl - 4 - methyl phenol, 2 - tertiary-butyl-4-methoxy phenol, nonyl phenol, dodecyl phenol, dinonyl phenol, phenyl phenol, tetradecyl phenol, and tetrahydro-α-naphthol.

Exemplary polyhydric phenols are orcinol,
propyl gallate,
catechol,
resorcinol,
4-octyl resorcinol,
4-dodecyl resorcinol,
4-octadecyl catechol,
4-isooctyl-phloroglucinol,
pyrogallol,
hexahydroxy benzene,
4-isohexyl-catechol,
2,6-ditertiarybutyl resorcinol,
2,6-diisopropyl phloroglucinol,
methylenebis(2,6-ditertiarybutyl-m-cresol),
methylenebis(2,6-ditertiarybutyl-phenol),
2,2-bis(4-hydroxy phenyl) propane,
methylenebis(p-cresol),
4,4'-thio-bis-phenol,
4,4'-oxobis (3-methyl-6-isopropyl-phenol),
4,4'-thiobis (3-methyl-6-tertiarybutyl-phenol),
2,2'-oxobis(4-dodecyl-phenol),
2,2'-thiobis(4-methyl-6-tertiarybutyl-phenol),
2,6-diisooctyl resorcinol,
4,4'-n-butylidenebis(2-tertiarybutyl-5-methylphenol),
4,4'-benzylidenebis(2-tertiarybutyl-5-methyl phenol),
2,2'-methylenebis(4-methyl-6-(1'-methyl-cyclohexyl)-phenol).
4,4'-cyclohexylidenebis(2-tertiarybutyl-phenol),
2,6-bis(2'-hydroxy-3'-tertiarybutyl-5'-methylbenzyl)-4-methylphenol,
4-octyl pyrogallol, and
3,5-ditertiarybutyl catechol.

When the organic phosphorus acid stabilizer is used in conjunction with triphosphite, the enhanced effect is evidence in elimination of discoloration on aging imparted by the triphosphite in relatively high concentrations, thus permitting use of larger amounts of triphosphite.

The triphosphite can be any organic triphosphite having attached to phosphorus through oxygen or sulfur or a mixture of the same three groups each selected from aryl, alkyl, cycloalkyl, aralkyl and alkaryl groups, in any combinations. Three monovalent groups, (RA)$_3$P; one monovalent group, R; and one bivalent group, R$_1$, forming a heterocyclic ring with the phosphorus,

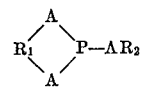

a plurality of bivalent groups forming polymers therewith,

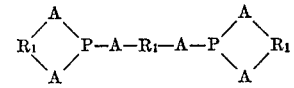

one trivalent group,

and a plurality of trivalent groups R$_2$ forming polymers therewith,

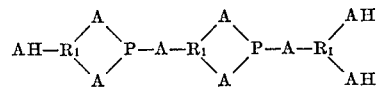

and any combinations of monovalent, bivalent and trivalent groups to form monomeric and polymeric phosphites; wherein A is oxygen or sulfur. The term "organic phosphite triester" as used herein is inclusive of oxo, thio and mixed oxo thio phosphites. Usually, the phosphite will not have more than about sixty carbon atoms.

Exemplary are monophenyl di-2-ethyl hexyl phosphite,
diphenyl mono-2-ethyl hexyl phosphite,
di-isooctyl monotolyl phosphite,
tri-2-ethyl hexyl phosphite,
phenyl dicyclohexyl phosphite,
phenyldiethyl phosphite,
triphenyl phosphite,
tricresyl phosphite,
tri(dimethylphenyl) phosphite,
trioctadecyl phosphite,
triisooctyl phosphite,
tridodecyl phosphite,
isooctyl diphenyl phosphite,
diisooctyl phenyl phosphite,
tri(t-octylphenyl) phosphite,
tri(t-nonylphenyl) phosphite,
benzyl methyl isopropyl phosphite,
butyl dicresyl phosphite,
isooctyl di(octylphenyl) phosphite,
di(2-ethylhexyl)(isooctylphenyl) phosphite,
tri(2-cyclohexylphenyl) phosphite,
tri-α-naphthyl phosphite,
tri(phenylphenyl) phosphite,
tri(2-phenyl ethyl) phosphite,
tridodecyl thio-phosphite,
tri-p-tert-butyl phenyl thiophosphite,
didecyl thiodiphenyl phosphite,
tert-butyl phenyl thio-di-2-ethylhexyl phosphite,
ethylene phenyl phosphite,
ethylene-t-butyl phosphite,
ethylene isohexyl phosphite,
ethylene isooctyl phosphite,
ethylene cyclohexyl phosphite,
2-phenoxy-1,3,2-dioxaphosphorinane,
2-butoxy-1,3,2-dioxaphosphorinane,
2-octoxy-5,5-dimethyl-dioxaphosphorinane and
2-cyclohexyloxy-5,5-diethyl-dioxaphosphorinane.

When the organic phosphorus acid stabilizer is used in conjunction with a thiodipropionic acid ester, the improvement is evidenced by a materially prolonged resistance to embrittlement and development of tackiness at elevated temperatures. The thiodipropionic acid ester has the following formula:

$$R_1OOCCH_2CH_2-S-CH_2CH_2COOY$$

in which $R_1$ is an organic R radical selected from the group consisting of hydrocarbon radicals such as alkyl, alkenyl, aryl, cycloalkyl; mixed alkyl aryl, and mixed alkyl cycloalkyl radicals; hydroxyalkyl and hydroxyalkyloxyalkylene radicals, and esters thereof with aliphatic carboxylic acids; and Y is selected from the group consisting of (a) hydrogen, (b) a second R radical $R_2$, which can be the same as or different from the $R_1$ radical, (c) a polymeric chain of $n$ thiodipropionic acid ester units $(OOCCH_2CH_2SCH_2CH_2COOXO)$, giving a polymer having the formula:

$$R_1O[OCCH_2CH_2SCH_2CH_2COOXO]_n$$
$$OCCH_2CH_2-S-CH_2CH_2COOZ$$

where Z is hydrogen, $R_2$ or M; $n$ is the number of thiodipropionic acid ester units in the chain; and X is a bivalent hydrocarbon group of the type of $R_1$; the value of $n$ can range upwards from 1, but there is no upper limit on $n$ except as is governed by the ratio of carbon atoms to sulfur atoms as stated below; and (d) of polyvalent metal M of Group II of the Periodic Table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

(a) $R_1OOCCH_2CH_2SCH_2CH_2COOH$
(b) $R_1OOCH_2CH_2SCH_2COOR_2$
(c) $R_1O[OCCH_2CH_2SCH_2CH_2COOXO]_n$
 $OCCH_2CH_2SCH_2CH_2COOZ$
(d) $R_1OOCCH_2CH_2SCH_2CH_2COOM$

In the above formulae $R_1$ and $R_2$, M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2,-propylene,

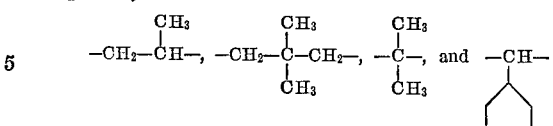

arylene radicals such as phenylene

methylenephenylene

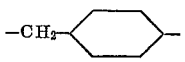

dimethylene phenylene,

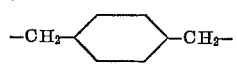

and alicyclene radicals such as cyclohexylene

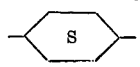

and cyclopentylene

As exemplary of the thiodipropionic acid esters which can be used, there can be mentioned the following: monolauryl thiodipropionic acid, dilauryl thiodipropionate, butyl stearyl thiodipropionate, 2-ethylhexyl-thiodipropionate, diisodecyl-thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate, monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

When the organic phosphorus acid stabilizer is used in conjunction with a polyvalent metal salt of an organic acid, the polyvalent metal salt of an organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicyclic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

The preferred stabilizer system of the invention comprises four stabilizers, the organic phosphorus acid, a polyhydric phenol, a triphosphite, and a thiodipropionic acid ester. An additional fifth ingredient which is included in the preferred systems of the invention, but which is not essential, is a polyvalent metal salt of an organic acid. These four and five stabilizers together give an enhanced stabilization which is not obtainable from any of them alone or in combinations of two or three. When taken alone, the components of this stabilizer system are capable only of inhibiting deterioration in one or two respects, and quite large amounts may be needed before any effect is noted. The components other than the organic phosphorus acid in pairs may display a lesser stabilizing effect than any one alone. For example, the phenol alone gives an improved resistance to embrittlement and reduction in melt viscosity at elevated temperatures, but little assistance as to maintenance of color. The triphosphite alone is a rather poor stabilizer in preventing deterioration in the first two properties, but it does assist in resisting discoloration.

The thiodipropionic acid ester by itself only improves resistance to embrittlement. The polyvalent salt of an organic acid by itself prevents discoloration, but no more. In combinations with the phenol, the color is worse than with the salt alone.

In combinations with the triphosphite, the usual discoloration is prevented, but black spots may be obtained upon aging at high triphosphite concentrations.

In view of this, it is surprising that the organic phosphorus acid, phenol, triphosphite and thiodipropionic acid ester taken together in the same total amount not only prevent discoloration but also embrittlement and inhibit the increase in melt index at processing temperatures with accompanying degradation of physical properties, and furthermore greatly enhance the resistance to discoloration and embrittlement on aging to far beyond that obtainable from the components individually. This enhanced stabilizing effect is obtained with any propylene polymer regardless of the process by which it is prepared.

A very small amount of the organic phosphorus acid stabilizer is sufficient, with or without additional stabilizers, to improve the stability against deterioration in physical propertes, including, for example, resistance to discoloration, under the conditions to which the olefin polymer will be subjected. Amounts within the range from about 0.005 to about 0.25% by weight of the polymer impart satisfactory discoloration resistance at elevated temperatures. Preferably, from 0.01 to 0.1% is employed for optimum stabilization.

If additional stabilizers are employed to obtain additional stabilization effects, the amount of total stabilizer is within the range from about 0.005 to about 5%, preferably from 0.1 to 2.5%.

Preferably, the stabilizer system comprises from about 0.001 to about 0.25% of organic phosphorus acid, from about 0.025 to about 0.5% of a phenol, from about 0.05 to about 1% of a thiodipropionic acid ester, and from about 0.024 to about 1.75% of an organic phosphite triester, with, optionally, from about 0.025 to about 0.75% of a polyvalent metal salt, when present.

If a combination of stabilizers is to be utilized, they may be formulated as a simple mixture for incorporation in the polymer by the polymer manufacturer or by the converter. An inert organic solvent can be used to facilitate handling, if the ingredients do not form a homogeneous mixture or solution.

The stabilizer of the invention is applicable to olefin polymers prepared by any of the various procedures, using the available catalysts, such as the Ziegler, ICI, Union Carbide, Du Pont, Phillips, Montecatini, Esso and Standard Oil (Indiana) process polymers, (Chem. & Eng. News, Nov. 21, 1960, pp. 36–59), for the molecular weight and tacticity are not factors affecting this stabilizer.

Formerly, olefin polymers prepared by these processes contained traces of catalyst residues. These residues materially diminished the stability of the olefin polymer, despite efforts to overcome the problem by addition of polyvinyl chloride resin stabilizers, whose function was to act on the halogen or halide of the catalyst in the same manner as on the halogen or liberated halide of the polyvinyl chloride resin. It is now customary to remove catalyst residues substantially completely, so that the addition of polyvinyl chloride resin stabilizers is no longer indicated. The stabilizers of the invention are effective with olefin polymers substantially free from catalyst residues, although they can also be used with catalyst-containing polymers with good results.

Isotactic polypropylene, available commercially under the trade names Pro-Fax, Escon and Olefane and having a softening or hot-working temperature of about 350° F., is an example of a sterically regular polypropylene polymer.

Polypropylene solid polymer can be defined in a manner to differentiate it from other polyolefins as having a density within the range of from 0.86 to 0.91, and a melting point above 150° C. The stabilizer of the invention is applicable to all such polypropylenes, as distinguished from polypropylenes in the liquid form or in semiliquid or gel-like forms, such as are used as greases and waxes.

Mixtures of olefin polymers such as propylene polymers with other compatible polymers and copolymers of propylene with copolymerizable monomers such as ethylene and butene also can be stabilized in accordance with this invention. For example, mixtures of polyethylene and polypropylene and copolymers of propylene and ethylene which contain a sufficient amount of propylene to present the instability problem that is resolved by the stabilizer of the invention, can be stabilized by the addition of an organic phosphorus acid alone or in combination with other propylene polymer stabilizers. The term "propylene polymer" as used herein includes, accordingly, homopolymers such as polypropylene, and propylene copolymers, and mixtures of propylene polymers, as discussed above.

The stabilizers of the invention can also be used with low density polyethylene, Ziegler polyethylene, high density polyethylene, poly(butene-1), poly(pentene-1), poly(3-methylbutene-1), poly-4 - methyl - pentene - 1, and polystyrene. The term "olefin polymer" encompasses both homopolymers and copolymers, as well as mixtures of olefin polymers.

The stabilizer is incorporated in the polymer in suitable mixing equipment, such as a mill or a Banbury mixer. If the propylene polymer has a melt viscosity which is too high for the desired use, the propylene polymer can be worked until its melt viscosity has been reduced to the desired range before addition of the stabilizer. However, propylene polymers in a range of workable melt viscosities are now available. Mixing is continued until the mixture is substantially uniform. The resulting composition is then removed from the mixing equipment and brought to the size and shape desired, for marketing or use.

The stabilized olefin polymer can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on aging and heating.

The stabilizing effect of the organic phosphorus acid of the invention was evaluated in the working examples which follow using a modified ASTM D1238–57T test procedure for determining melt index, using a 2160 g. weight load on the plastometer piston, comparing melt index before and after heating the polymer in a mold at 600° F. for 30 minutes. The 600° F. temperature was selected as an extreme, resistance to which for the test period ensured stability to lower temperatures for considerably extended periods. The change in melt index for this period is an accurate measure of the degree of heat stabilization imparted by the stabilizer added, irrespective of the numerical value of the initial melt indices of the different samples of one particular polymer. The lower the ratio the less the change, and the greater the stabilizing effect.

Example 1

In accordance with this invention diphenylphosphite was weighed and dispersed by hand stirring in powdered previously unstabilized polypropylene (Profax 6501) in the proportions indicated in Table I, below. This polymer as supplied had a melt index of 3.0, ASTM D1238–57T at 230° C. The mixture so prepared was in each case placed on a 2-roll mill and fluxed for five minutes at 170±2° C.

The stabilized polypropylene, sample B, was compared with the unstabilized sample, A, of the same polymer by tsting pieces cut from a milled sheet of each sample composition in the above described manner.

TABLE I

| | Sample No. | |
|---|---|---|
| | A | B |
| Polypropylene (Profax 6501), parts | 100 | 100 |
| Diphenylphosphite, parts | | 0.10 |
| Melt Index: | | |
| $M_I$ | 3.0 | 2.7 |
| $M_{600° F.}$ | 67.1 | 15.7 |
| $M_{600° F.}/M_I$ | 22.4 | 5.8 |
| Heat Aging at 150° C., hours to failure | 8 | 12 |

$M_I$ = Initial Melt Index.
$M_{600° F.}$ = Melt Index after 30 min. at 600° F.
$M_{600° F.}/M_I$ = Melt Index Ratio indicating change in melt index.

The above data clearly indicate that the diphenyl-phosphite increased the resistance of the polymer to degradative deterioration on prolonged exposure to elevated temperatures. The melt index ratio was lower for the polymer containing the diphenyl phosphite than for the polymer not stabilized in accordance with this invention.

Example 2

Polypropylene stabilized by dilauryl thiodipropionate was further improved by the addition of diphenyl phosphite. The stabilizers named in Table II were weighed and dispersed by hand stirring in 100 parts of powdered previously unstabilized polypropylene (Profax 6501). This polymer as supplied had a melt index of 3.0, ASTM D1238–57T at 230° C. To each polymer sample was added 0.50 part of dilauryl thiodipropionate by hand stirring; an additional 0.1 part of diphenyl phosphite acid was added to Sample No. D, as indicated in Table II. The mixture was in each case placed on a 2-roll mill and fluxed for five minutes at 170±2° C. Pieces cut from the milled sheet were used in the tests.

TABLE II

| | Sample No. | |
|---|---|---|
| | C | D |
| Polypropylene (Profax 6501), parts | 100 | 100 |
| Dilauryl thiodipropionate, parts | 0.50 | 0.50 |
| Diphenylphosphite, parts | | 0.10 |
| Melt Index: | | |
| $M_I$ | 2.7 | 2.8 |
| $M_{600° F.}$ | 31.5 | 25.7 |
| $M_{600° F.}/M_I$ | 11.7 | 9.2 |
| Heat Aging at 150° C., hours to failure | 14.0 | 135.5 |

These data clearly indicate that the diphenyl-phosphite increased the resistance of the polymer to degradative deterioration on prolonged exposure to elevated temperatures. The melt index ratio was lower for the polymer containing the diphenyl phosphite.

Example 3

Commercially available prestabilized polypropylene was compared with the same polymer to which diphenyl phosphite had been added as an additional stabilizer in accordance with this invention. A total of 0.05 to 0.1% stabilizer was used. The diphenyl phosphite was weighed and dispersed by hand stirring in powdered prestabilized polypropylene (Profax 6512 and Profax 6523). The mixture was placed on a 2-roll mill and fluxed for five minutes at 170±2° C. Pieces cut from the milled sheet were tested for heat stability in the above-described manner.

TABLE III

| | Sample No. | | | | |
|---|---|---|---|---|---|
| | E | F | G | H | I |
| Polypropylene (Profax 6512), parts | 100 | 100 | | | |
| Polypropylene (Profax 6523), parts | | | 100 | 100 | 100 |
| Diphenyl phosphite, parts | | 0.05 | | 0.05 | 0.1 |
| Melt Index: | | | | | |
| $M_I$ | 2.5 | 5.2 | 3.0 | 3.4 | 3.4 |
| $M_{600° F.}$ | 57.8 | 32.6 | 27.4 | 21.7 | 15.3 |
| $M_{600° F.}/M_I$ | 23.1 | 6.3 | 9.1 | 6.4 | 4.5 |
| Heat Aging at 150° C., hours to failure | 757 | 895 | 519 | 731 | 731 |

The data of Table III clearly indicate that the organic phosphorus acid stabilizer improved the resistance of these prestabilized polypropylene to prolonged exposure at high temperatures. The diphenyl phosphite limited the increase in melt index due to degradative deterioration on long-term exposure to elevated temperatures, and increased resistance to aging at 150° C. In addition, there was no noticeable discoloration.

Example 4

Polypropylene alone and previously stabilized by ditertiary butyl p-cresol was further improved by the addition of 2,2-dimethylpropane-1,3-cyclic phosphite. The stabilizers named in Table IV were weighed and dispersed by hand stirring in 100 parts of powdered previously unstabilized polypropylene (Profax 6501; summer 1960 supply). This polymer as supplied had a melt index of 1.0, ASTM D1238–57T at 230° C. In some cases 0.25 part of ditertiary butyl p-cresol was used; an additional 0.1 part of 2,2-dimethyl-propane-1,3-cyclic phosphite was added in two cases as indicated in Table IV. The mixture was in each case placed on a 2-roll mill and fluxed for five minutes at 170±2° C. Pieces cut from the milled sheet were used in the tests.

TABLE IV

| | Sample No. | | | |
|---|---|---|---|---|
| | J | K | L | M |
| Polypropylene (Profax 6501), parts | 100 | 100 | 100 | 100 |
| Ditertiary butyl p-cresol, parts | | | 0.25 | 0.25 |
| 2,2-dimethylpropane-1,3-cyclic phosphite, parts | | 0.1 | | 0.1 |

The results indicated that the addition of an organic phosphorus acid in accordance with this invention increased the resistance of the polymer to degradative deterioration on prolonged exposure to elevated temperatures. The addition of phosphite to the polymer containing a phenol overcame the decreased resistance to degradative deterioration upon exposure to elevated temperatures resulting from the addition of the phenol. Moreover, no discoloration was noted. The organic phosphorus acid is thus valuable in combination with some stabilizers which, although valuable in preserving some other physical property of a polymer, diminish its high temperature stability.

Example 5

A series of stabilized polypropylene compositions were prepared, using various quantities and combinations of stabilizers in accordance with the invention. A blend of triphosphite and phenol was prepared before incorporation with metal salt, the thiodipropionic acid ester, and the resin, to prevent separation of the bisphenol. The concentrates of phenol and triphosphite were blended with zinc 2 ethylhexoate and dilauryl thiodipropionate. Equal portions of the above described stabilizing mixture were weighed and dispersed by hand stirring in powdered previously unstabilized polypropylene (Sun Polymer). The so stabilized polypropylene was compared with similarly stabilized polypropylene to which diphenyl phosphite or dioctyl phosphite had been added, the polymer alone, and the polymer stabilized with diphenyl or diocytl phosphite only.

TABLE V

| | Sample No. | | | | | | | | | | |
|---|---|---|---|---|---|---|---|---|---|---|---|
| | N | O | P | Q | R | S | T | U | V | W | X |
| Polyproplyene (Sun Polymer), parts | 100 | 100 | 100 | 100 | 100 | 100 | 100 | 100 | 100 | 100 | 100 |
| Isooctyl diphenyl phosphite, parts | | 0.14 | 0.14 | 0.14 | 0.28 | 0.28 | 0.28 | 0.28 | 0.28 | 0.28 | 0.14 |
| Zinc 2-ethylhexoate, parts | | 0.06 | 0.06 | 0.06 | 0.12 | 0.12 | 0.12 | 0.12 | 0.12 | 0.12 | 0.06 |
| 4,4'-butylidene-bis(2-methyl-5-tert-butyl phenol) parts | | 0.05 | 0.05 | 0.05 | 0.10 | 0.10 | 0.10 | 0.10 | 0.10 | 0.10 | 0.05 |
| Dilauryl thiodipropionate, parts | | 0.25 | 0.25 | 0.25 | 0.5 | 0.5 | 0.5 | 0.5 | 0.5 | 0.5 | 0.25 |
| Diphenyl phosphite, parts | | 0.1 | | | 0.05 | 0.10 | | 0.05 | 0.10 | | |
| Dioctyl phosphite, parts | | | | 0.10 | | | | | | 0.10 | 0.10 |
| $M_I$ | 3.0 | 3.7 | 5.1 | 3.1 | 2.7 | 2.7 | 2.7 | 2.7 | 2.7 | 2.9 | 3.1 |
| $M_{600° F}$ | 84.2 | 31.4 | 38.3 | 34.3 | 11.9 | 22.4 | 43.2 | 24.0 | 20.0 | 23.0 | 26.3 |

A comparison of the melt indices obtained from these tests indicates, as above tabulated, that the organic phosphoros acid appreciably increased the thermal stability of the polypropylene, in conjunction with the other stabilizers used; and there was no discoloration when the organic phosphoros acid was present. Therefore, the stabilizing compositions of this invention may effectively be used to increase the resistance of polypropylene to degradative deterioration on long term exposure to high temperatures during hot working, calendering, molding, etc.

Example 6

A series of compositions, using previously unstabilized polypropylene, and various quantities and combinations of stabilizers in accordance with the invention, and in the proportions indicated in the table below, were prepared in accordance with the method described in Example 5. The effect on the stabilization of the polymer by the addition of diphenyl phosphite was noted.

TABLE VI

| | Sample No. | | | |
|---|---|---|---|---|
| | Y | Z | AA | BB |
| Polypropylene (Profax 6501), parts | 100 | 100 | 100 | 100 |
| Isooctyl diphenyl phosphite, parts | 0.14 | 0.14 | 0.28 | 0.28 |
| Zinc 2-ethylhexoate, parts | 0.06 | 0.06 | 0.12 | 0.12 |
| 4,4'-thiobis (2-tert-butyl-5-methylphenol), parts | 0.05 | 0.05 | 0.10 | 0.10 |
| Dilauryl thiodipropionate, parts | 0.25 | 0.25 | 0.50 | 0.50 |
| Diphenyl phosphite, parts | | 0.05 | | 0.05 |
| Melt Index: | | | | |
| $M_I$ | 3.1 | 3.1 | 3.1 | 3.1 |
| $M_{600° F}$ | 25.6 | 11.1 | 48.6 | 25.0 |
| Heat Aging at 150° C., Hours to failure | 295 | 500 | 420 | 765 |

In each of the above samples the greater heat stability, as evidenced by the lower melt index and improved heat aging, together with absence of discoloration, was achieved with diphenyl phosphite as a stabilizer.

Example 7

A series of polypropylene stablizing combinations was prepared in accordance with Example 5 using the proportions of Table VII below. Diisooctyl phosphite was used as the organic phosphoros acid stabilizer. The portions of stabilizers were weighed and dispersed by hand stirring in powdered previously unstabilized polypropylene (Sun Polymer). This polymer as supplied had a melt index of 3.0, ASTM D1238–57T at 230° C. The mixture was placed on a 2-roll mill and fluxed for five minutes at 170±2° C. Pieces cut from the milled sheet were used in the tests.

TABLE VII

| | Sample No. | |
|---|---|---|
| | CC | DD |
| Polypropylene (Sun Polymer), parts | 100 | 100 |
| Isooctyl diphenyl phosphite, parts | 0.28 | 0.28 |
| Zinc 2-ethylhexoate, parts | 0.12 | 0.12 |
| 4,4'-thiobis (2-tert-butyl-5-methylphenol), parts | 0.10 | 0.10 |
| Dilauryl thiodipropionate, parts | 0.50 | 0.50 |
| Diisooctyl phosphite, parts | | 0.1 |
| Melt Index: $M_{600° F}$ | 159 | 117 |
| Aging at 150° C., hours to failure | 429 | 595 |

The diisooctyl phosphite appreciably increased the resistance of the polymer to degradative deterioration and eliminated discoloration, indicating an increased thermal stablity of the polymer.

Example 8

Polypropylene stabilized with triphenyl phosphite transesterified with 0.5 mole of n-butylidene-4,4'-bis (2-tert-butyl-5-methylphenol) and 2 moles of tridecyl alcohol, in combination with dilauryl thiodipropionate was compared with a polymer so stabilized containing diphenyl phosphite as an additional stabilizer.

The transesterified blend of phosphite, alcohol and phenol was prepared before incorporation with the polypropylene, 4,4'-n-butylidene-bis (2-tertiary-butyl-5-methylphenol) (0.5 mole), triphenyl phosphite (one mole) and sodium hydroxide (0.5 g.) were stirred and heated at 100° to 120° C. for three hours, and vacuum stripped to 170° C. on the water pump. Next, the tridecyl alcohol (2 moles) was added and the mixture again vacuum stripped to 170° C. on the water pump. At the end of this time, a clear brown solution had formed, and this solution remained homogeneous at room temperature.

The stabilizers were weighed and dispersed by hand stirring in powdered previously unstabilized polypropylene (Profax 6501) in the proportions indicated in the following table. The resulting mixtures were each placed on a 2-roll mill and fluxed for five minutes at 170±2° C. Pieces cut from the milled sheet were tested as in the previous examples.

TABLE VIII

| | Sample No. | |
|---|---|---|
| | EE | FF |
| Polypropylene (Profax 6501), parts | 100 | 100 |
| Transesterified mixture of triphenyl phosphite, 4,4'-n-butylidenebis (2-tert-butyl-5-methylphenol) and tridecyl alcohol, parts | 0.5 | 0.42 |
| Dilauryl thiodipropionate, parts | 0.25 | 0.25 |
| Diphenyl phosphite, parts | | 0.08 |
| Melt Index: $M_{500°\,F}$ | 41.6 | 17.7 |

The diphenyl phosphite appreciably reduced the degradative decomposition of the polypropylene due to exposure to heat, as evidenced by lower melt index and absence of discoloration.

Example 9

Commercially available prestabilized polypropylenes, Profax 6511 and 6512, were compared with such polymers to which di(octylphenyl) phosphite had been added in accordance with this invention in the proportions indicated in the table below:

TABLE IX

| | Sample No. | | | |
|---|---|---|---|---|
| | GG | HH | II | JJ |
| Commercial Prestablized Polypropylene (Profax 6511), parts | 100 | 100 | | |
| Commercial Prestablized Polypropylene (Profax 6512), parts | | | 100 | 100 |
| Di(octylphenyl) phosphite, parts | | 0.1 | | 0.1 |

A comparison of the final melt indices indicated that the addition of the di(octylphenyl) phosphite to commercially available prestabilized polypropylene markedly improved its thermal stability as evidenced by its lesser increase in melt index, and lack of discoloration upon prolonged exposure to elevated temperatures.

Having regard to the foregoing disclosure, the following is claimed as the inventive and patentable embodiments thereof:

1. A stabilizer combination for use in improving the resistance of olefinic polymers to deteriorate in physical properties on exposure to heat, consisting essentially of from about 0.1 to about 25 parts by weight of an organic phosphorus acid containing trivalent phosphorus, and from about 2.4 to about 175 parts by weight of an organic phosphite triester, the stabilizers being compatible with polypropylene and having a low vapor pressure at polypropylene working temperatures.

2. A stabilizer combination in accordance with claim 1 including in addition from about 2.5 to about 50 parts by weight of a phenol.

3. A stabilizer combination in accordance with claim 2 wherein the phenol is a bicyclic phenol.

4. A stabilizer combination in accordance with claim 1 including in addition from about 5 to about 100 parts by weight of a thiodipropionic acid ester.

5. A stabilizer combination in accordance with claim 1 consisting essentially of from about 0.1 to about 25 parts by weight of an organic phosphorus acid containing trivalent phosphorus, from about 2.5 to about 50 parts by weight of a phenol, from about 2.4 to about 175 parts by weight of an organic phosphite triester, and from about 5 to about 100 parts by weight of a thiodipropionic acid ester.

6. An olefin polymer composition having improved resistance to deterioration upon exposure to heat comprising an olefin polymer and from about 0.005 to about 5% by weight of a stabilizer combination in accordance with claim 1.

7. An olefin polymer composition in accordance with claim 6 in which the olefin polymer is a propylene polymer.

8. An olefin polymer composition in accordance with claim 7 in which the propylene polymer is polypropylene.

9. An olefin polymer composition in accordance with claim 6 comprising an olefin polymer and from about 0.1 to about 2.5% by weight of a stabilizer composition consisting essentially of from about 0.001% to about 0.25% of an organic phosphorus acid containing trivalent phosphorus, from about 0.025 to about 0.5% of a phenol having from about ten to about fifty carbon atoms, from about 0.05 to about 1% of a thiodipropionic acid ester and from about 0.024 to about 1.75% of an organic phosphite triester containing up to about sixty carbon atoms, the stabilizer combination being compatible with the polymer and having a low vapor pressure at olefin polymer working temperatures.

10. An olefin polymer composition in accordance with claim 9 wherein the organic phosphite triester is selected from the group consisting of $(RA)_3P$;

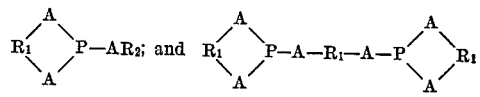

wherein the R's are organic groups selected from the group consisting of aryl, alkyl, cycloalkyl, aralkyl, alkaryl, arylene, alkylene, cycloalkylene, aralkylene and alkarylene groups, and A is selected from the group consisting of sulfur and oxygen.

11. An olefin polymer composition in accordance with claim 9 wherein the phenol is a polynuclear phenol having the formula:

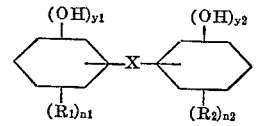

wherein X is selected from the group consisting of oxygen, sulfur and bivalent hydrocarbon groups having from one to about eighteen carbon atoms, $y_1$ and $y_2$ are the number of phenolic hydroxyl groups, $n_1$ and $n_2$ are the number of R groups, the total of $n+y$ in each ring does not exceed 5, and $R_1$ and $R_2$ are selected from the group consisting of hydrogen and alkyl groups having from one to about eighteen carbon atoms.

12. An olefin polymer composition in accordance with claim 9 wherein the organic phosphorus acid containing trivalent phosphorus has the formula:

wherein Z is selected from the group consisting of two monovalent organic radicals, one bivalent organic radical, and one monovalent organic radical and one hydroxyl group, the organic radicals being connected to the phosphorus through atoms selected from the group consisting of oxygen and carbon.

13. An olefin polymer composition in accordance with claim 9 wherein the thiodipropionic acid ester has the formula:

(R₁OOCCH₂CH₂SCH₂CH₂COOY)

wherein $R_1$ is an organic radical selected from the group consisting of hydrocarbon radicals, hydroxyalkyl and hydroxyalkyloxyalkylene radicals and esters thereof with aliphatic carboxylic acids, and Y is selected from the group consisting of hydrogen; hydrocarbon radicals; hydroxyalkyl and hydroxyalkyloxyalkylene radicals and esters thereof with aliphatic carboxylic acids; polyvalent metals of Group II; and a polymeric chain of thiodipropionic acid ester units having the formula:

(XOOCCH₂CH₂SCH₂CH₂COO)ₙ wherein X is a bivalent hydrocarbon radical and $n$ is the number of thiodipropionic acid ester units in the chain.

References Cited

UNITED STATES PATENTS

| | | | |
|---|---|---|---|
| 2,462,331 | 2/1949 | Myers | 260—23 |
| 2,860,115 | 11/1958 | Hecker et al. | 260—23 |
| 3,033,814 | 5/1962 | Tholstrup | 260—45.85 |
| 3,069,369 | 12/1962 | Galbraith et al. | 260—23 |
| 3,349,058 | 10/1967 | Mills et al. | 260—45.85 |

FOREIGN PATENTS 1,235,047  5/1960  France.

DONALD E. CZAJA, *Primary Examiner.*

R. A. WHITE, *Assistant Examiner.*

UNITED STATES PATENT OFFICE
CERTIFICATE OF CORRECTION

Patent No. 3,398,115            August 20, 1968

Arthur C. Hecker et al.

It is certified that error appears in the above identified patent and that said Letters Patent are hereby corrected as shown below:

Column 1, line 47, after "except" insert -- such --. Column 2, line 39, "an heterocyclic" should read -- a heterocyclic --; lines 45 and 46, "formallytrivalent" should read -- formally trivalent --; line 57, "phosphorus" should read -- phosphorous Column 3, line 5, "153-195" should read -- 193-195 --; line 51, "represents" should read -- represent --. Column 7, lines 2 to 5, the left-hand formula should appear as shown below:

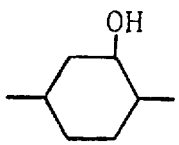

same column 7, lines 5 to 20, after each group insert a comma and insert a period after the line 20. Column 8, line 68, "2-phenox 1,3,2-dioxaphosphorinane," should read -- 2-phenoxy-1,3-2-dioxaphosphorinane, --; line 69, "2-butoxy-1,3,2-dioxaphosphorinane," should read -- 2-butoxy-1,3-2-dioxaphosphorinane, --. Column 9, line 17, insert a hyphen at the end of the first line of the formula; line 37, formula (b) should appear as shown below

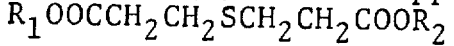

line 38, first line of formula (c) should appear as shown below:

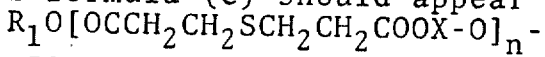

Column 10, lines 3 to 30, after each radical insert a comma and after the last radical insert a period. Column 11, line 75, "propertes" should read -- properties --. Column 12, line 30, "taciticity" should read -- tacticity --. Column 13, line 48, "tsting" should read -- testing --. Column 15, line 32, "2 ethylhexoate" should read -- 2-ethylhexoate --; line 39, "diocyt should read -- dioctyl --; lines 58 and 59, and 62, and column 1 line 23, "phosphoros", each occurrence, should read -- phosphorou --. Column 16, line 19, "stablizing" should read -- stabilizing --; line 60, "stability" should read -- stability --. Column 17, line 5, "stablizers" should read -- stabilizers --; TABLE VIII, (2)

the parts for dilauryl thiodipropionate for Samples No. EE and FF should each read -- 0.25 --; TABLE IX, first column, lines 1 and 3 thereof, "Prestablized", each occurrence, should read -- Prestabilized --; line 60, "of olefinic polymers to deteriora should read -- of olefin polymers to deterioration --.

Signed and sealed this 3rd day of March 1970.

(SEAL)
Attest:

EDWARD M. FLETCHER, JR.
Attesting Officer

WILLIAM E. SCHUYLER, JR.
Commissioner of Patents

Disclaimer 3,398,115.—*Arthur C. Hecker*, Forest Hills, N.Y., and *Norman L. Perry*, Wayne, N.J. POLYOLEFINS STABILIZED WITH MIXTURES COMPRISING AN ORGANIC PHOSPHORUS ACID, PHOSPHITE TRIESTER AND THIODIPROPIONATE. Patent dated Aug. 20, 1968. Disclaimer filed Nov. 12, 1969, by the assignee, *Argus Chemical Corporation*.

Hereby enters this disclaimer to claim 1 of said patent.

[*Official Gazette March 31, 1970.*]